April 2, 1929.  A. SCHUBERT  1,707,576

RACK

Filed Jan. 11, 1927

Witnesses:

Inventor:
Alfred Schubert.

Patented Apr. 2, 1929.

1,707,576

UNITED STATES PATENT OFFICE.

ALFRED SCHUBERT, OF GROSS-HENNERSDORF, NEAR HERRNHUT, GERMANY.

RACK.

Application filed January 11, 1927, Serial No. 160,402, and in Germany November 2, 1926.

This invention relates to an improved rack comprising a plurality of horizontal superposed bars arranged in pairs behind one another and connected at their ends by four vertical corner supports spaced apart by two cross-members at the upper and lower ends of the rack, and the novelty consists in making said rack telescopic in such a way that said horizontal bars are hollow and adapted to receive a similar rack part from both lateral ends of the rack, so that the rack can be used in the inserted position of the two lateral rack parts or in the withdrawn position of one or of both of said rack parts, to suit requirements of use.

Figure 1:
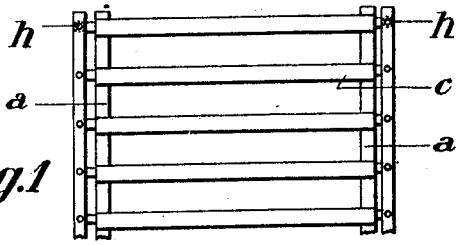
Figure 2:
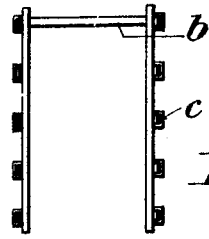
Figure 3:
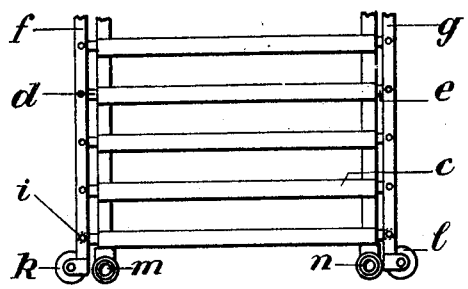
Figure 3:
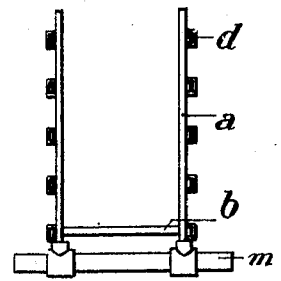
Figure 3:
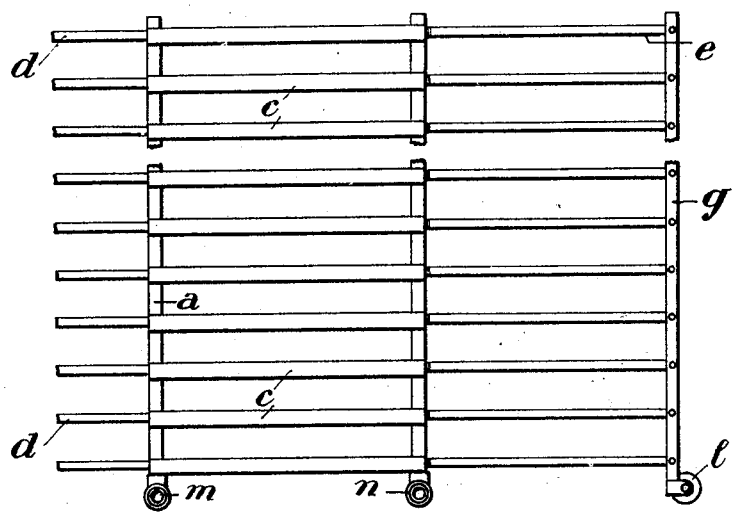
Figure 4:
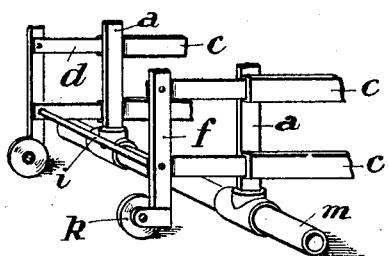

The accompanying drawing illustrates the improved rack: Fig. 1 is a front view thereof with the two lateral rack parts in their inserted position, Fig. 2 is an end view of the rack with the respective lateral rack part removed, Fig. 3 is a similar view to Fig. 1 with the two lateral rack parts in their withdrawn position, and Fig. 4 is a perspective view of one lower rack end.

The rack comprises a plurality of horizontal superposed bars $c$ arranged in pairs behind one another and connected at their ends by four vertical corner supports $a$ spaced apart by two cross-members $b$ at the upper and lower lateral ends of the rack and carried by tubular feet $m$, $n$, this being already known in the art.

According to the invention, the rack is telescopic in such a way that the bars $c$ are hollow, preferably of rectangular cross-section (Figs. 2 and 4) and adapted to receive a similar rack part from both lateral ends of the rack. Said rack parts consist of solid bars $d$ and $e$ respectively with vertical corner supports $f$ and $g$ respectively spaced apart by a cross-member $h$, $i$ at the upper and lower free lateral ends of the rack part and carries by foot-rollers $k$ and $l$ respectively.

The rack can be used either in the inserted position of both rack parts, or in the withdrawn position of one or of both of said rack parts, to suit requirements of use.

What I claim, is:—

1. In a rack, in combination, a fixed member comprising a plurality of parallel hollow superposed bars arranged in pairs one behind another, four vertical corner posts connecting the ends of and supporting said hollow bars, cross members by which said posts are spaced at the ends of the rack, a sliding member comprising a plurality of solid horizontal bars adapted to slide within said hollow members a frame connecting the ends of said solid bars and rollers supporting said frame.

2. In a rack, in combination, an immovable part comprising a plurality of horizontal hollow members, standards connecting and supporting the ends of said hollow members, struts for spacing said standards apart and two movable members each comprising a plurality of solid horizontal bars adapted to fit and slide within the hollow members of the immovable part of the rack, transverse frames connecting and supporting the ends of said solid bars and rollers supporting said frames the movable parts of the rack moving on said rollers.

In testimony whereof I have hereunto set my hand.

ALFRED SCHUBERT.